United States Patent
Schuetz et al.

(10) Patent No.: US 11,851,312 B2
(45) Date of Patent: Dec. 26, 2023

(54) TRANSPORT VEHICLE

(71) Applicants: HUBTEX MASCHINENBAU GMBH & CO. KG, Fulda (DE); DIMOS MASCHINENBAU GMBH, Petersberg (DE)

(72) Inventors: Alfred Rudi Schuetz, Fulda (DE); Pascal Alfred Schuetz, Fulda (DE); Juergen Keller, Grossenlueder (DE)

(73) Assignees: HUBTEX MASCHINENBAU GMBH & CO. KG, Fulda (DE); DIMOS MASCHINENBAU GMBH, Petersberg (DE)

( * ) Notice: Subject to any disclaimer, the term of this patent is extended or adjusted under 35 U.S.C. 154(b) by 553 days.

(21) Appl. No.: 17/040,558

(22) PCT Filed: Mar. 21, 2019

(86) PCT No.: PCT/EP2019/057035
§ 371 (c)(1),
(2) Date: Sep. 23, 2020

(87) PCT Pub. No.: WO2019/185436
PCT Pub. Date: Oct. 3, 2019

(65) Prior Publication Data
US 2021/0061632 A1  Mar. 4, 2021

(30) Foreign Application Priority Data
Mar. 28, 2018 (DE) .................... 10 2018 107 430.1

(51) Int. Cl.
*B66F 9/075* (2006.01)
*B62D 6/00* (2006.01)

(52) U.S. Cl.
CPC ....... *B66F 9/07568* (2013.01); *B60L 2240/24* (2013.01); *B60Y 2200/15* (2013.01); *B62D 6/002* (2013.01)

(58) Field of Classification Search
CPC ... B66F 9/07568; B60L 2240/24; B62D 6/002
See application file for complete search history.

(56) References Cited

U.S. PATENT DOCUMENTS

| 3,572,459 A | * | 3/1971 | Nieminski | .......... | B66F 9/07568 |
| | | | | | 280/93.514 |
| 4,364,449 A | * | 12/1982 | Knight | .................... | B62D 7/00 |
| | | | | | 180/271 |

(Continued)

FOREIGN PATENT DOCUMENTS

| DE | 3015415 A1 * | 5/2016 | ............. B62D 11/24 |
| EP | 0 982 220 A2 | 3/2000 | |

(Continued)

*Primary Examiner* — Tony H Winner
(74) *Attorney, Agent, or Firm* — Norman B. Thot

(57) ABSTRACT

A transport vehicle includes two non-steered drive wheels, two non-driven steered load wheels, drive motors for driving the drive wheels, a steering target value encoder, a device for detecting the steering angle of one of the load wheels, and an electric control unit. An actuation of the steering target value encoder displaces a steering pole along a steering pole axis. The steering target value encoder steers each of the load wheels from a first position in which the load wheels' axes run parallel to the drive wheels' axes into a second position in which the load wheels' axes are oriented to the steering pole which lies between the drive wheels. The electronic control unit influences a rotational speed of the drive motors as a function of the steering angle and reverses a direction of rotation of at least one of the drive motors as a function of the steering angle.

4 Claims, 4 Drawing Sheets

(56) References Cited

U.S. PATENT DOCUMENTS

| | | | |
|---|---|---|---|
| 4,598,797 A * | 7/1986 | Schultz | B66F 17/003 |
| | | | 180/271 |
| 2002/0014360 A1 | 2/2002 | Nakakita et al. | |
| 2003/0070862 A1 | 4/2003 | Tartara | |
| 2004/0007415 A1 | 1/2004 | Kouyama | |
| 2015/0090507 A1* | 4/2015 | Okada | B66F 9/07568 |
| | | | 701/50 |
| 2018/0201156 A1* | 7/2018 | Mangette | B60L 15/2036 |
| 2022/0002125 A1* | 1/2022 | Goshima | B62D 6/002 |

FOREIGN PATENT DOCUMENTS

| | | |
|---|---|---|
| EP | 2 145 812 A2 | 1/2010 |
| EP | 3 015 415 A1 | 5/2016 |
| JP | H08-113156 A | 5/1996 |
| JP | 2002-46994 A | 2/2002 |
| JP | 2003-531075 A | 10/2003 |
| JP | 2004-149117 A | 5/2004 |
| JP | 2005-112300 A | 4/2005 |
| WO | WO 01/70556 A1 | 9/2001 |

\* cited by examiner

TRANSPORT VEHICLE

CROSS REFERENCE TO PRIOR APPLICATIONS

This application is a U.S. National Phase application under 35 U.S.C. § 371 of International Application No. PCT/EP2019/057035, filed on Mar. 21, 2019 and which claims benefit to German Patent Application No. 10 2018 107 430.1, filed on Mar. 28, 2018. The International Application was published in German on Oct. 3, 2019 as WO 2019/185436 A1 under PCT Article 21(2).

FIELD

The present invention relates to a transport vehicle with at least four wheels, wherein a steering pole is displaced along a steering pole axis, which is non-displaceable relative to the vehicle, by actuating the steering target value encoder.

BACKGROUND

A two-axle transport vehicle with four wheels was previously described, for example, in WO 01/70556 A1. In this vehicle, a steering program, also known as "all-wheel steering," can be switched over during travel to a second steering program for rotating the steering pole axis of all wheels in the same direction by actuating the steering target value encoder, also known as "diagonal steering." In all-wheel steering, when the steering target value encoder is actuated, the steered wheels are actuated so that the axes of rotation of the steered wheels always intersect in the steering pole. In contrast thereto, in diagonal steering, the wheels are steered as a function of the steering target value encoder so that the axes of rotation of the wheels extend parallel, i.e., the steering pole is positioned at infinity. If the steering target value encoder is actuated when diagonal steering has been selected, the vehicle performs a change in direction, but without changing its orientation, whereas when all-wheel steering has been selected, the orientation of the vehicle takes place by changing the direction of travel.

To be able to change the orientation of the vehicle relative to the direction of travel thereof where required independently of the currently selected steering program, a further control member is provided in this vehicle which, where required, can be actuated simultaneously with the steering target value encoder. Actuating this second control member leads to a correction of the steering angle of the wheels of at least one axle in a manner not corresponding to the selected steering program, namely, approximately proportionally to the deflection of the control member, which is formed as a joystick.

A drawback of the prior art is that the vehicle is very complex to manufacture and that the steering of a vehicle of this type requires considerable exertion and also considerable concentration in daily operation if undesirable travel situations, which may in some cases be difficult to manage, are to be prevented.

SUMMARY

An aspect of the present invention is to provide a vehicle which is improved with regard to at least one of the aforementioned drawbacks.

In an embodiment, the present invention provides a transport vehicle which includes at least four wheels which include two drive wheels, each of which is driven but not steered, and each of which comprises an axis, and two load wheels, each of which is steered but not driven, and each of which comprises an axis. The transport vehicle further incudes a plurality of electric drive motors, one of the plurality of electric drive motors being configured to drive one of the two drive wheels, a steering target value encoder, at least one non-steered axle which comprises the two drive wheels, at least one steered axle which comprises the two load wheels, a device for detecting the steering angle of one of the two load wheels, and an electric control unit. An actuation of the steering target value encoder displaces a steering pole along a steering pole axis. The steering target value encoder is configured to steer each of the two load wheels from a first position in which the axis of each of the two load wheels runs parallel to the axis of the two drive wheels into a second position in which the axis the two load wheels is oriented to the steering pole which lies between the two drive wheels. The electronic control unit is configured to influence a rotational speed of the plurality of electric drive motors as a function of the steering angle and to reverse a direction of rotation of at least one of the plurality of electric drive motors as a function of the steering angle.

BRIEF DESCRIPTION OF THE DRAWINGS

The present invention is described in greater detail below on the basis of embodiments and of the drawings in which.

DETAILED DESCRIPTION

Figure 1:
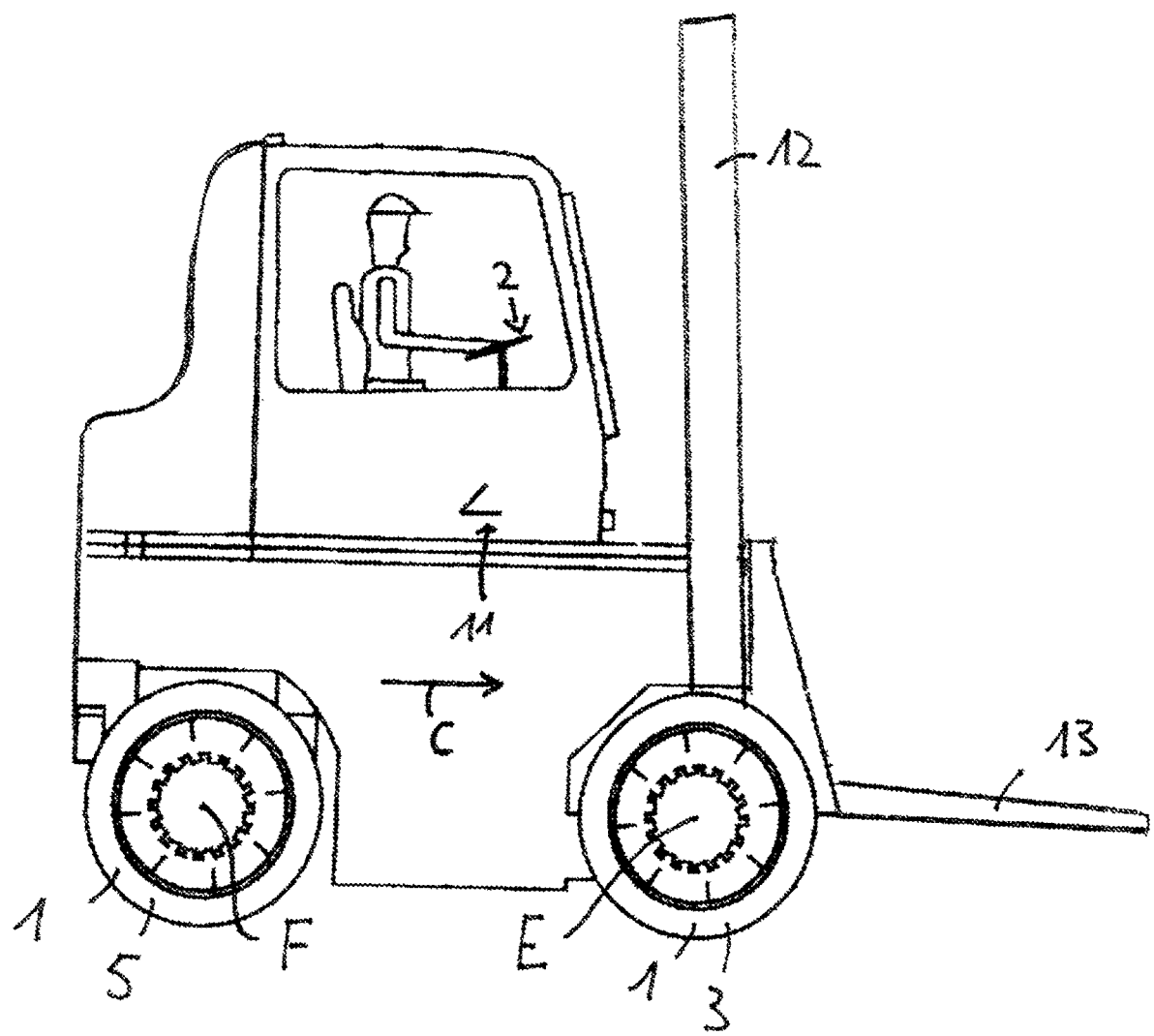
FIG. 1 is a schematic side view of a two-axle transport vehicle, using the example of a forklift truck.

The transport vehicle according to the present invention has at least four wheels and a steering target value encoder. A steering pole is displaced along a steering pole axis by actuating the steering target value encoder. The term "steering pole" as used herein designates a point toward which the axes of the wheels are oriented during cornering, at least in an embodiment with exactly one non-steered axle.

The vehicle has at least one non-steered axle, which may also be referred to as a non-steered vehicle wheel axis, with two drive wheels, each of which is non-steered and each of which is driven with a separate electric drive motor. The term "non-steered vehicle wheel axle" as used herein in particular designates a vehicle wheel axis on which, for example, exclusively, non-steered wheels are arranged.

The vehicle has at least one steered axle, which may also be designated as a steered vehicle wheel axle, with at least two non-driven, steerable load wheels. The term "steered vehicle wheel axle" as used herein in particular designates a vehicle wheel axle on which, for example, exclusively, steered wheels are arranged. In an embodiment, exactly two steered wheels, in particular load wheels, can, for example, be arranged on a steered vehicle wheel axle. In an embodiment, more than two, for example, four steered wheels, in particular load wheels, can, for example, be arranged on a steered wheel axle.

In an embodiment, the transport vehicle can, for example, be two-axled. In an embodiment, it can, for example, be three-axled or have more than three vehicle wheel axles, as is known from some trucks.

In an embodiment, the vehicle has exactly one non-steered axle. In an embodiment, the vehicle has two or more non-steered axles.

In an embodiment, the vehicle can, for example, have exactly one steered axle. In an embodiment, the vehicle can, for example, have two or more steered axles.

Each wheel is thus, for example, steered or driven. Exclusively non-driven wheels can, for example, be steered.

Each of these load wheels can be steered using the steering target value encoder from a position in which the axis of this load wheel runs parallel to an axis of the drive wheels into a position in which the axis of this load wheel is oriented to a steering pole lying between the drive wheels. A high maneuverability of the vehicle can be provided as a result of a large steering range of this type.

In an embodiment, all load wheels of the vehicle can, for example, be non-driven and all drive wheels of the vehicle can, for example, be non-steered. If the drive wheels are non-steered, the steering pole axis is non-displaceable relative to the vehicle and the vehicle merely has exactly one steering pole axle, at least in the embodiment with exactly one non-steered axle. The steering pole axis is coincident with the axis of the two drive wheels in the embodiment with exactly one non-steered axle.

The vehicle has a device for detecting the steering angle of at least one load wheel. This device may also be referred to as a steering angle sensor.

The device for detecting the steering angle of at least one load wheel may comprise an angle sensor that is arranged on the load wheel, and this device can thus detect the actual steering angle. Since the position of the steering pole can already be determined from the steering angle of exactly one load wheel, it is in principle conceivable to only provide exactly one device for detecting the steering angle of exactly one of the load wheels.

It is also possible to provide exactly one device for steering angle detection that detects the steering angles of a plurality, for example, all, of the load wheels or a plurality of devices for detecting the steering angle of a plurality, for example, all, of the load wheels. Detecting the steering angle of all load wheels can, for example, in particular be provided if, as in an embodiment, a steering regulation device is provided.

The device for detecting the steering angle of at least one load wheel may be provided on the steering target value encoder, and can thus detect the target steering angle.

Both the target value of the steering value and the actual value may be determined, and a steering regulation device may be provided, for example, in the electronic control device, for bringing the actual value toward the target value if a difference exists.

An electronic control device is provided and configured so as to influence the rotational speed of the drive motors as a function of the steering angle.

The electronic control device is additionally configured to reverse the direction of rotation of at least one of the drive motors as a function of the steering angle.

The electronic control device can, for example, be configured, at least in the embodiment with exactly one non-steered axis, to reduce the rotational speed of one of the drive motors to zero at exactly a particular steering angle of at least one of the load wheels and to reverse the direction of rotation of this drive motor if the steering angle increases further.

The electronic control device can, for example, be configured to reverse the direction of rotation of a drive motor at a steering angle at which the axes of the load wheels point toward the drive wheel driven by the motor.

In other words, the electronic control device can, for example, be configured to reverse the direction of rotation of one of the drive motors when the rotation pole of the drive wheel that this drive motor drives passes along the steering pole axis at a particular steering angle.

The electronic control device can, for example, also be referred to as an electronic differential gear. The positioning of the load wheels can thus, for example, specify to the drive motors via the electronic control device how rapidly and in what direction the drive motors are driving the associated wheel to thereby at least largely prevent a slipping on the subsurface.

The electronic control device can, for example, have an input that is operatively connected to the device for detecting the steering angle of at least one load wheel. The electronic control device can, for example, have a further input that is operatively connected to the speed target value encoder.

The electronic control device can, for example, have an output that is operatively connected to one of the drive motors, and, for example, additionally have a further output that can, for example, be operatively connected to a different drive motor. The electronic control device can, for example, have a separate output for each drive motor.

A vehicle comprising a control device of this type may also generally (if it has all-wheel steering, for example, unlike the vehicle according to the present invention) enable translation and/or rotation of the steering pole axis and thus be formed as an extremely maneuverable two-way or multi-way vehicle. A translation and/or rotation of the steering pole axis is in contrast made impossible by the non-steered drive wheels in the vehicle according to the present invention. It has surprisingly been found that the combination according to the present invention of an electronic control device of this type with non-steerable drive wheels leads to a vehicle which can already be highly maneuverable, for example, when compared with a vehicle with track rod steering, and, because of the non-steerable drive wheels, is inexpensive to produce and can be formed to be simple to control, for example, when compared with a vehicle with all-wheel steering.

Each load wheel can, for example, be steered from a position in which the axis thereof runs parallel to an axis of the drive wheels into a position in which the axis thereof is oriented to a steering pole lying centrally between the drive wheels of a non-steered axle. The maneuverability can thereby be even further increased.

The steering target value encoder may, for example, be formed as a steering wheel or as a joystick.

The load wheels of a steered axle can, for example, be formed at a distance from one another; they are therefore, for example, not twin wheels. The same can, for example, apply to the drive wheels.

The influence of the electronic control device on the rotational speed of the drive motors can take place in the form of control or regulation. If it takes place in the form of regulation, rotational sensors that detect the actual value of the rotational speed of the drive wheels can, for example, be provided on the drive wheels, and this actual value of the rotational speed is compared with the value predetermined by the speed target value encoder and compensated thereto if a difference exists.

The term "load wheel" as used herein in particular designates each non-driven wheel.

A separate drive motor can, for example, be flange-mounted directly on each drive wheel.

In an embodiment, the diameter of the load wheels can, for example, be less than the diameter of the drive wheels. In an embodiment, the diameter of all of the wheels can, for example, be the same.

A particularly simple control of the vehicle results if the electronic control device is configured to bring about the reversal in the direction of rotation automatically.

In an embodiment, the axes of at least two load wheels can, for example, be oriented mutually perpendicular. The vehicle can thereby be brought into a parking position.

In an embodiment, the load wheels of a steered axle are not, for example, mechanically interconnected, for example, via a track rod. Each load wheel is therefore, for example, steerable independently of another load wheel.

For example, at least one and, for example, every steering wheel is steerable through a steering angle of more than 90°.

In an embodiment, at least one and, for example, every steering wheel is steerable through a steering angle of less than 180°, for example, less than 135°.

In an embodiment, at least one and, for example, every load wheel is steerable through 360° or indefinitely.

The load wheels can, for example, be steered hydraulically or electrically. In an embodiment, the load wheels can, for example, be steered electrically and an electric steering motor is provided, for example, a separate electric steering motor for each load wheel.

The distance of the load wheels from one another may be less than the distance of the drive wheels from one another.

In an embodiment, the drive wheels can, for example, be formed as front wheels and the load wheels as rear wheels of the vehicle.

In an embodiment, the vehicle can, for example, be provided as a forklift truck.

The vehicle can, for example, have an upright mast on which a forklift arrangement is arranged to able to be raised and lowered. The drive wheels can, for example, be arranged on the side of the vehicle facing the forklift arrangement, and the load wheels can, for example, be on the side of the vehicle facing away from the forklift arrangement.

The electronic control device can, for example, be configured to influence the rotational speed of the drive motors as a function of the distance of the respective drive wheel from the rotation pole, which is based on the steering angle of a load wheel. This can, for example, take place in accordance with the mathematical relationship between the circumference of the circular path on which the respective drive wheel runs and the distance thereof from the circle center defined by the steering pole, in other words the radius of this circle.

The invariable position, predetermined by the vehicle geometry, of at least one load wheel perpendicular to the axes of the drive wheels and, for example, parallel thereto, is stored in the electronic control device. The electronic control device can, for example, determine the distance of each drive wheel from the steering pole predetermined by the steering angle from this stored position and the steering angle using angle functions such as the tangent.

One possible embodiment of the present invention is described below by way of example under reference to the accompanying drawings.

As is shown in FIG. 1, the embodiment shown in the drawings of the transport vehicle according to the present invention, denoted 100 as a whole, is implemented as a two-axle forklift truck, with a steering target value encoder 2 formed as a steering wheel. As is shown in FIGS. 2 to 4, the diameter of the load wheels 5, 5' is less than the diameter of the drive wheels 3, 3' (the load wheels 5, 5' and the drive wheels 3, 3' are shown having the same size in FIG. 1 purely for simplicity).

FIG. 1 shows that the transport vehicle has an upright mast 12, on which a forklift arrangement 13 (not shown in FIGS. 2 to 4 for simplicity) is arranged so as to be able to be raised and lowered.

Figure 2:
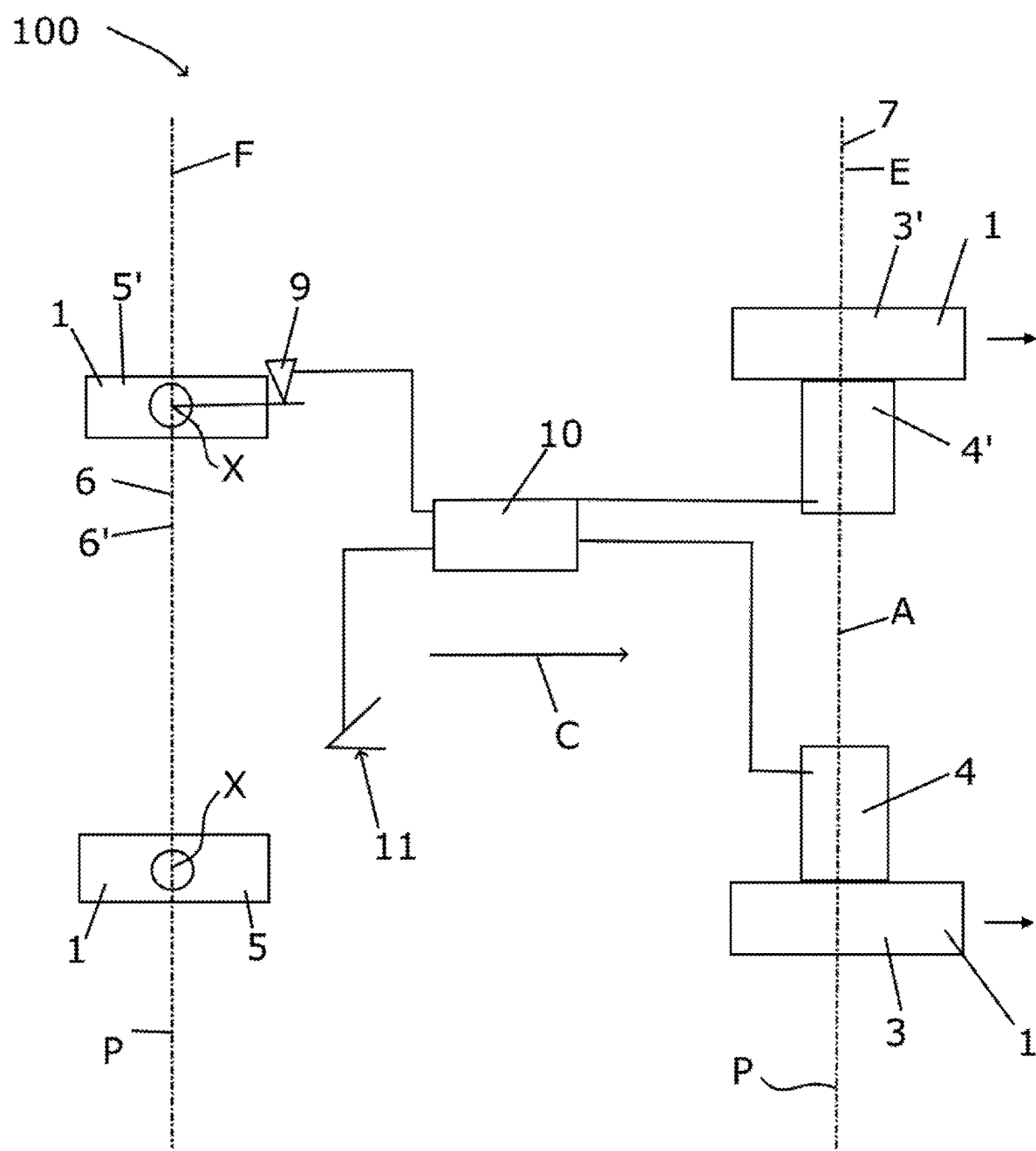
FIG. 2 is a schematic diagram of the transport vehicle shown in FIG. 1, in a view from above during straight-line travel.
Figure 3:
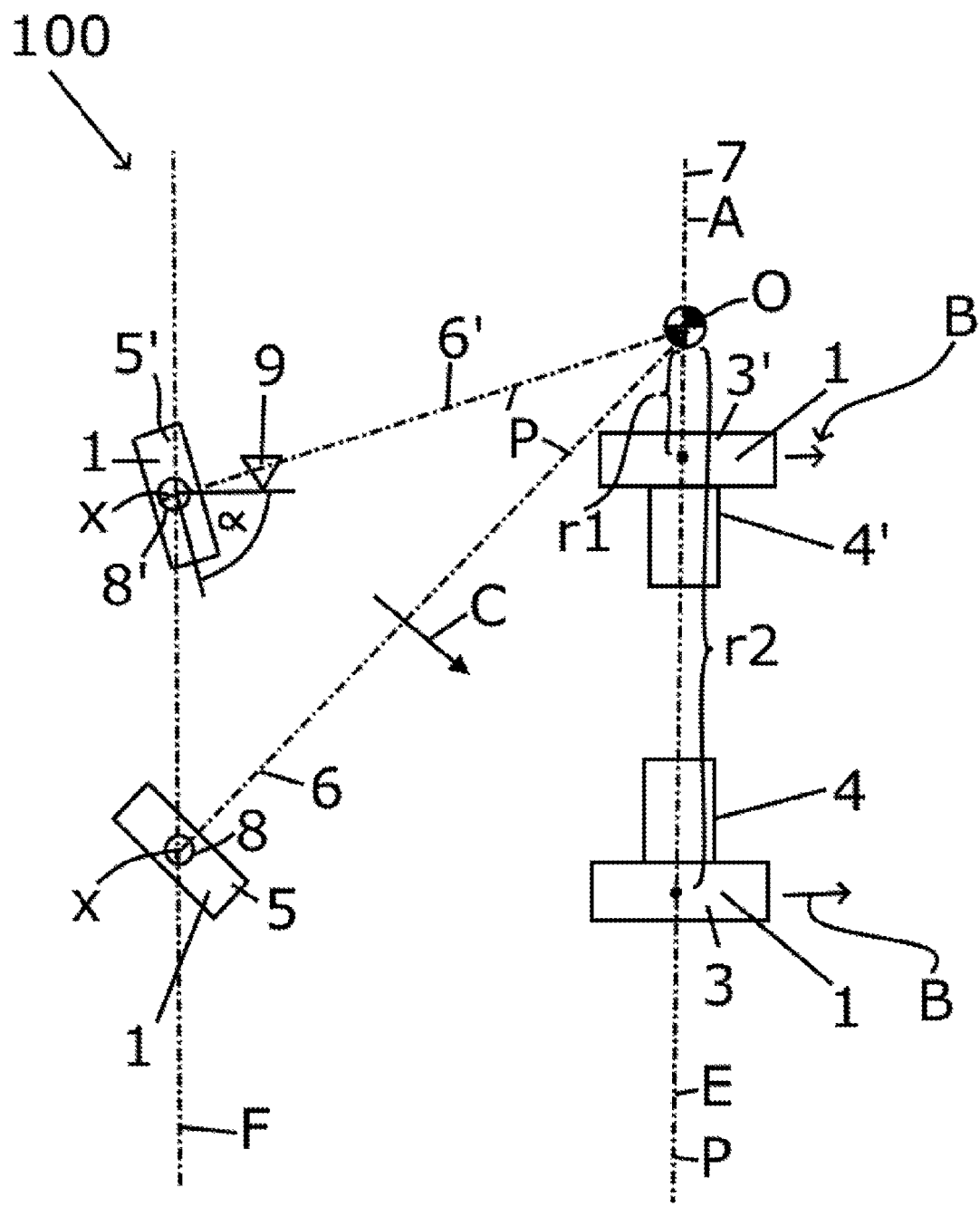
FIG. 3 is the diagram of FIG. 2 during cornering.
Figure 4:
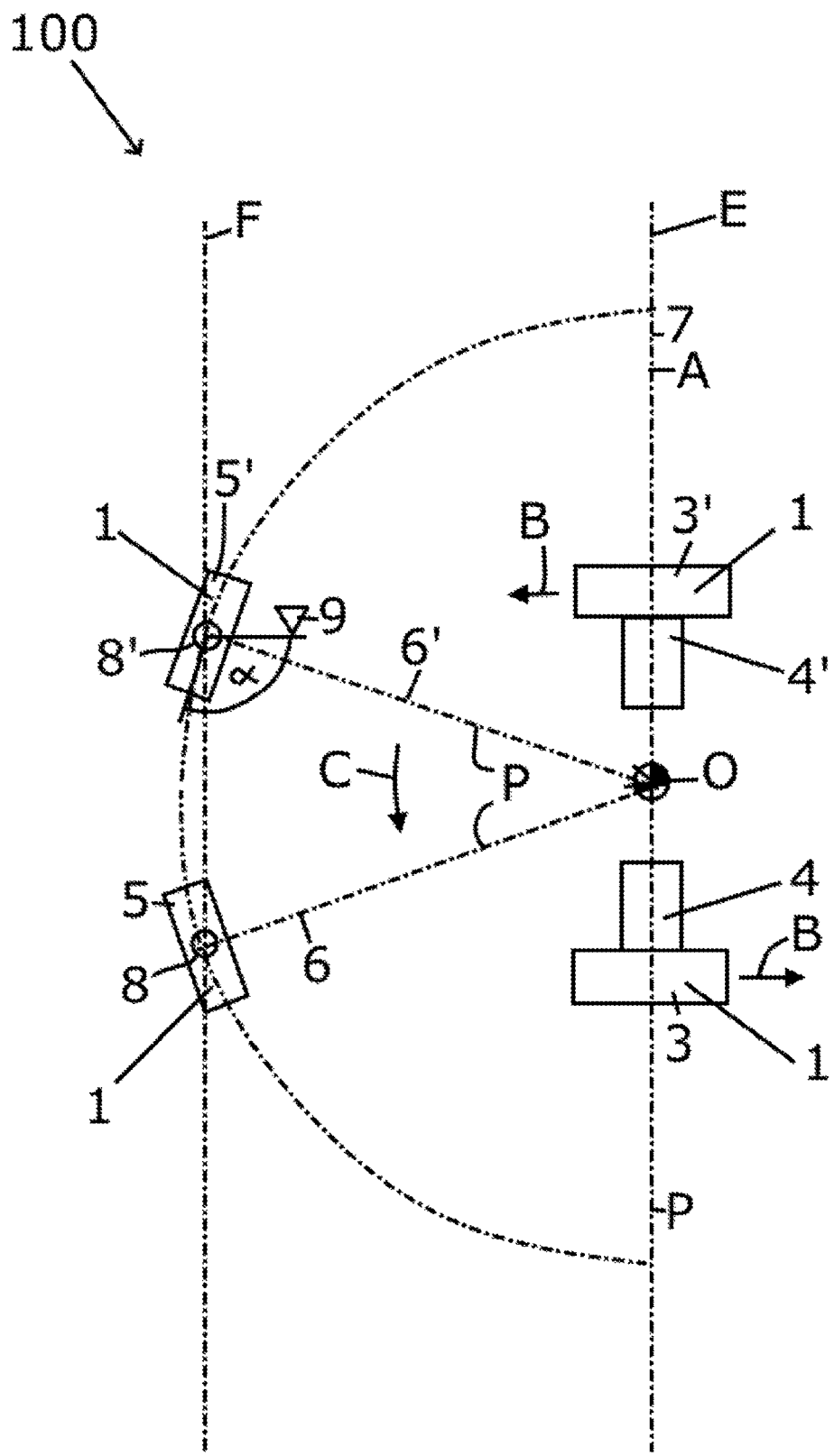
FIG. 4 is the diagram of FIG. 2 in the case of a rotation pole lying between the drive wheels.

The two load wheels 5, 5' are arranged rotatable about wheel axes 6, 6' and each steerable about a steering axis X which extends perpendicular to the plane of the drawing in FIGS. 2 to 4.

The speed target value encoder 11 shown in FIGS. 1 and 2 is implemented as a gas pedal, and specifies the target value for the drive power of the electric drive motors 4, 4'.

In the shown embodiment, the distance of the load wheels 5, 5' from one another is less than the distance of the drive wheels 3, 3' from one another.

It can be seen, for example, from FIG. 2 that the transport vehicle 100 has four wheels 1. As can be seen, for example, from a comparison of FIGS. 3 and 4, a steering pole O, to which the wheel axes P of the wheels 1 are oriented during cornering, is displaced along a steering pole axis A by actuating the steering target value encoder 2. Arrow C shows the direction of travel of the transport vehicle 100 in all of the drawings.

FIG. 2 also shows that the transport vehicle 100 has a non-steered vehicle axle E with two drive wheels 3, 3'. Each of these drive wheels 3, 3' is non-steered and is driven with a separate electric drive motor 4, 4'.

The transport vehicle 100 has a steered vehicle wheel axle F with two steerable load wheels 5, 5', each of which is non-driven.

As a comparison of FIGS. 2, 3 and 4 shows, each of the load wheels 5, 5' can be steered, using the steering target value encoder 2, from a position (shown in FIG. 2) in which the axis 6, 6' of the load wheels 5, 5' runs parallel to an axis 7 of the drive wheels 3, 3' into a position (shown in FIG. 4) in which the axis 6, 6' of the load wheels 5, 5' is oriented to a steering pole O lying between the drive wheels 3, 3'.

It can also be seen in FIG. 2 that a device 9 (symbolized as a triangle) for detecting the steering angle α of a load wheel 5' is provided. In the embodiment shown in the drawings, a device 9 for detecting the steering angle α of a load wheel 5' is merely provided on this exactly one load wheel 5'. This device 9 detects the steering angle α away from the zero position shown in FIG. 2 in the two possible steering directions. It is sufficient to detect exactly one steering angle α in order to determine the position of the steering pole O. A device 9 for detecting the steering angle α of the other load wheel 5 may, however, also be provided on this load wheel.

A separate electric drive motor 4, 4' is flange-mounted directly on each drive wheel 3, 3'.

FIG. 2 shows an electronic control device 10 (not shown in FIGS. 3 and 4 for simplicity). The electronic control device 10 has inputs that are operatively connected to the device 9 for detecting the steering angle α and the speed target value encoder 11 and outputs that are operatively connected to the two electric drive motors 4, 4'. The electronic control device 10 is configured to influence the rotational speed of the electric drive motors 4, 4' as a function of the steering angle α detected with the device 9 and to reverse the direction of rotation of each of the two electric drive motors 4, 4' as a function of the steering angle α. This takes place so that during cornering, as shown, for example, in FIG. 3, the curve-inside drive wheel 3' is driven more slowly than the curve-outside drive wheel 3, as is shown by the two different-length arrows B in FIG. 3. If the electronic control device 10 determines from the detected steering angle α that the rotation pole O has reached and passed the position of a drive wheel 3' (as has taken place between FIGS. 3 and 4), the electronic control device 10 reverses the direction of rotation of this wheel 3' automatically, as is shown by the arrows B pointing in different directions in FIG. 4.

The electronic control device 10 is configured to influence the rotational speed of the electric drive motors 4, 4' as a function of the distance r1, r2, determined by way of the steering angle α, of the associated drive wheel 3, 3' from the rotation pole O, in accordance with the mathematical relationship between the circumference of the circular path on which the associated drive wheel 3, 3' runs and the distance r1, r2 thereof from the circle center defined by the steering pole O, in other words the radius of this circle.

FIG. 4 shows the situation where the axes 6, 6' of the load wheels 5, 5' are oriented to a steering pole O lying exactly centrally between the drive wheels 3, 3'.

As is shown, for example, in FIG. 4, each load wheel 5, 5' can be steered through a steering angle α of more than 90°. Each load wheel 5, 5' may be steerable indefinitely.

In the shown embodiment, the load wheels 5, 5' are steered electrically by an electric steering motor 8, 8'.

The present invention is not limited to embodiments described herein; reference should be had to the appended claims.

LIST OF REFERENCE NUMERALS

100 Transport vehicle
1 Wheels
2 Steering target value encoder
3, 3' Drive wheels
4, 4' Electric drive motor
5, 5' Load wheels
6, 6' Axes of the load wheels
7 Axis of the drive wheels
8, 8' Electric steering motor
9 Device for detecting the steering angle
10 Electronic control device
11 Speed target value encoder
12 Mast
13 Forklift arrangement
A Steering pole axis
B Arrows
C Direction of travel arrow
E Non-steered vehicle axle
F Steered vehicle wheel axle
O Steering pole
P Wheel axes
X Steering axes
α Steering angle

What is claimed is:

1. A transport vehicle comprising:
    at least four wheels comprising,
        two drive wheels each of which is driven but not steered, and each of which comprises an axis, and
        two load wheels each of which is steered but not driven, and each of which comprises an axis;
    a plurality of electric drive motors, one of the plurality of electric drive motors being configured to drive one of the two drive wheels;
    a steering target value encoder, wherein an actuation of the steering target value encoder displaces a steering pole along a steering pole axis, the steering target value encoder being configured to steer each of the two load wheels from a first position in which the axis of each of the two load wheels runs parallel to the axis of the two drive wheels into a second position in which the axis the two load wheels is oriented to the steering pole which lies between the two drive wheels;
    at least one non-steered axle which comprises the two drive wheels;
    at least one steered axle which comprises the two load wheels;
    a device for detecting a steering angle of at least one of the two load wheels; and
    an electronic control unit which is configured,
        to influence a rotational speed of the plurality of electric drive motors as a function of the steering angle,
        to reverse a direction of rotation of at least one of the plurality of electric drive motors as a function of the steering angle, and
        to automatically reverse the direction of rotation of the at least one of the plurality of electric drive motors when the steering pole of the one of the two drive wheels which is driven by the at least one of the plurality of electric drive motors passes along the steering pole axis,
    wherein,
    the at least one steered axle includes two axes and the two axes of the two load wheels are orientable mutually perpendicular with respect to each other.

2. The transport vehicle as recited in claim 1, wherein, the two load wheels are not interconnected using a track rod, and
    each of the two load wheels is configured to be steered independently.

3. The transport vehicle as recited in any of claim 1, wherein each of the two load wheels is steerable through more than 90°.

4. The transport vehicle as recited in claim 1, wherein each of the two load wheels is steerable through 360° or indefinitely.

* * * * *